Nov. 27, 1928.
L. W. NAYLOR
1,693,206
REVIVIFICATION OF FILTERING MATERIALS
Filed Aug. 31, 1922
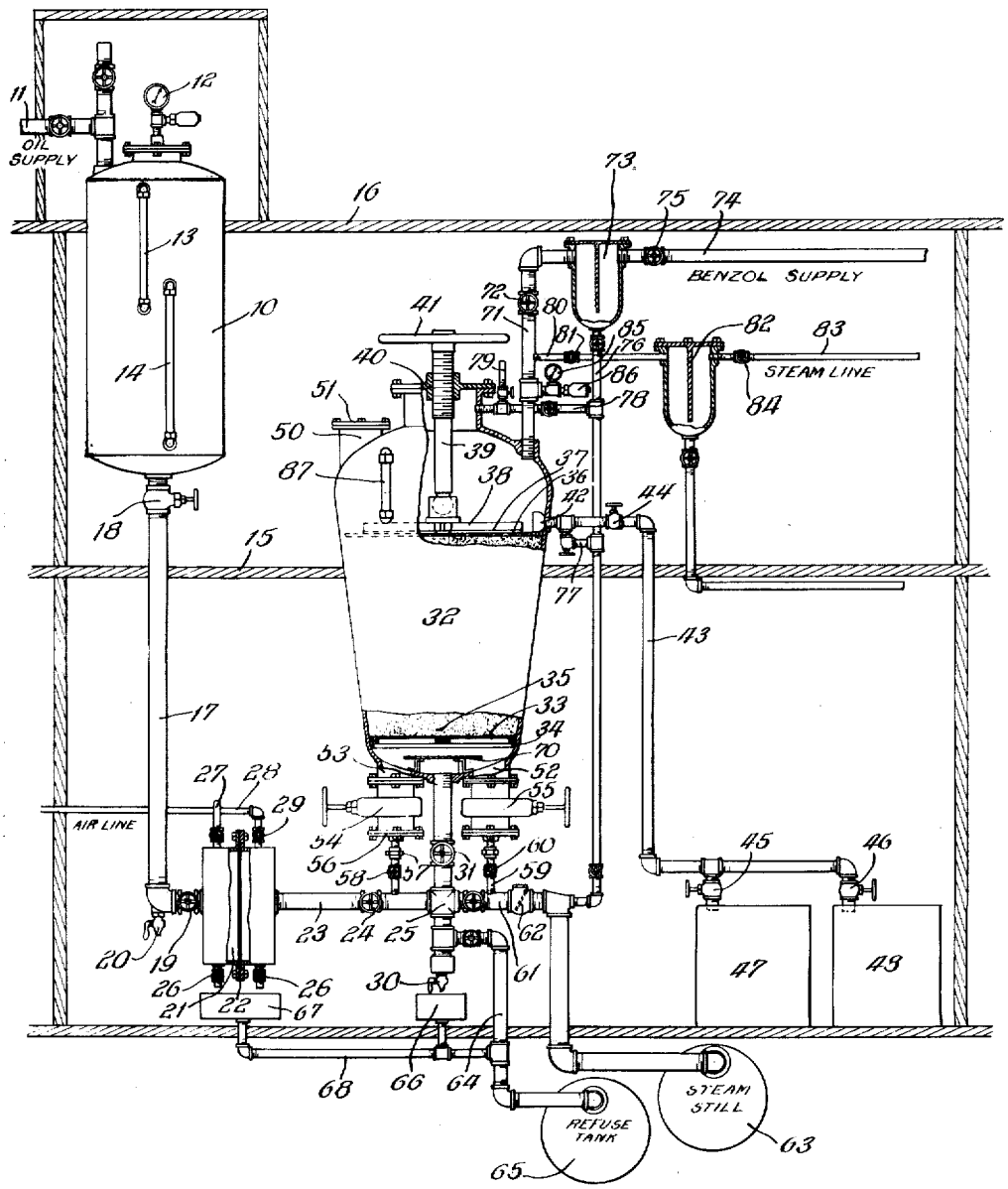

Patented Nov. 27, 1928.

1,693,206

UNITED STATES PATENT OFFICE.

LESLIE W. NAYLOR, OF FLORENCE, COLORADO, ASSIGNOR TO CONTINENTAL OIL COMPANY, OF DENVER, COLORADO, A CORPORATION OF MAINE.

REVIVIFICATION OF FILTERING MATERIALS.

Application filed August 31, 1922. Serial No. 585,422.

This invention relates to the revivification or restoration of filtering materials to their original efficiency after they have become spent or choked by the accumulation of matter left behind by oil or the like passing through the filter, and has for its principal object to accomplish the restoration more completely than has been heretofore possible and with a minimum cost and labor.

A further object of the invention is to accomplish the restoration with a minimum of handling and loss of the material.

A further object of the invention is to equip a filter with apparatus by which the materials, such as fuller's earth, can be treated partly or entirely within the filter chamber.

Further objects of the invention will become apparent as the disclosure proceeds and the description is read in connection with the accompanying drawing, which illustrates a selected embodiment of the invention.

When filtering materials, such as fuller's earth, are used for filtering oil, the carbon or other foreign substances absorbed or extracted accumulate in the earth and rob it of its efficiency and eventually render it unfit for use unless this accumulation of foreign matter is removed. Various attempts have been made to get rid of accumulated products of filtration and restore fuller's earth or other clay to its original condition. Most of these attempts have proved very unsatisfactory so far as I am aware. At the present time it is somewhat customary to treat used fuller's earth with steam to remove the soaked oils and to burn it to eliminate, as far as possible, the carbon and other foreign substances that do not yield to the steam. This, however, is only partially successful and the filtering materials treated in this way lose efficiency with each use and treatment until they must eventually be discarded.

I have discovered that benzol, or cold gas oil as it is sometimes called, will act upon the accumulated foreign material extracted from petroleum and similar oils and entirely revive and restore the fuller's earth and like substances to their original efficiency, and in some cases it appears to increase the efficiency of the materials treated.

Most of the carbon and other foreign matter extracted from petroleum and like oils by filtering materials collects on the side where the oil enters. For example: in an 8 ft. filter that has been used for the usual period without cleaning, about 3 feet adjacent to the oil inlet will be very black and otherwise extremely marked with the accumulated foreign matter, whereas the remaining 5 feet will have an increasingly less amount of foreign matter. On this account I have found it very advantageous to pass the benzol through the filtering material in a direction opposite to that in which the oil moves during the filtering process.

I have found it practical to equip a filter with suitable inlets and piping leading to sources of supply and storage for benzol and steam so that the filtering material can be treated partly or entirely without removing it from the filter chamber. The accompanying drawing illustrates such an apparatus.

Referring to the drawing, 10 indicates a suitable storage tank for oil which is connected with a supply pipe 11 leading to any suitable source. This tank is also equipped with the necessary gauges etc. 12, 13 and 14, found convenient or necessary in practice. Usually this tank will be supported in an elevation so as to feed the oil by gravity to and through the filter. As shown it is supported somewhat above the second floor 15 and projects through the third floor 16 of a suitable building. A pipe 17 equipped with suitable valves 18 and 19 and a drain cock 20 leads from the bottom of the tank 10 to a trap 21 equipped with a screen 22 usually of 100 mesh wire, which in turn is connected by a pipe 23 equipped with a valve 24 to an upright header 25. The trap 21 has suitable drain cocks 26, a vent 27, and a connection 28 with a source of compressed air which is controlled by a valve 29 and used to blow out the screen 23. The header 25 has a drain cock 30 at the bottom, and a valve 31 adjacent to its upper end where it communicates with the bottom of a filter chamber 32. Spaced from the bottom of the filter is a suitable screen 33, preferably 100 mesh wire, turned into an angle iron 34 and calked with lead. Upon this screen is a suitable quantity of filtering material, such as fuller's earth 35. On top of the fuller's earth is another fine screen 36, on top of which is a coarse screen 37 held down by a suitable head 38 connected with the stem 39 threaded into a cover 40 and equipped with a hand wheel 41.

An outlet 42 communicates with the filter chamber just above the screen 37 and connects with a pipe 43 controlled by valves 44, 45 and 46 and leading to the pans 47 and 48.

The upper end of the chamber is equipped with a filling opening 50 closed by a cover 51. The bottom of the chamber is equipped with two large tubular passages 52 and 53 which are controlled by gate valves 54 and 55. The valve 54 is connected by a suitable flange joint 56 with a small pipe 57 leading to the pipe 23 and controlled by a valve 58. The valve 55 is similarly connected with a pipe 59 controlled by a valve 60 and leading to a pipe 61 equipped with a check valve 62 and communicating with a steam still 63. The header 25 is connected by a pipe 64 with a refuse tank 65. Drip pans 66 and 67 are connected by suitable piping 68 with the pipe 64.

Just above the discharge end of the header 25 is placed a baffle plate 70 to prevent the oil from perforating or otherwise making openings in the filtering material.

The upper end of the chamber is equipped with a pipe 71 controlled by a valve 72 and communicating through a trap 73 with a source of benzol supply 74. If desired a valve 75 may be located beyond the trap 73. Preferably the bottom of the trap is connected by a pipe 76 with the pipe 61 leading to the steam still, and pipes 77 and 78 connect the upper end of the filter chamber and the oil discharge with the steam still. The pipe 78 is conveniently equipped with an air vent 79. The pipe 80 controlled by valve 81 connects the pipe 71 below the valve 72 through a trap 82 with a steam line 83 which is controlled by a valve 84. The pipe 71 is equipped with a suitable gauge 85 and pop valve 86 below the junction with the pipe 80 and the upper portion of the filter chamber is fitted with a suitable gauge glass 87.

A storage tank 10 and a filter chamber together with most of the communicating piping should be enclosed within a heating room, or provided with suitable heating jackets and insulating covers. The oil to be filtered is heated in the tank 10 and led through the trap 21 and strainer 22 to the bottom of the filter chamber and allowed to work its way through the filter material to the outlet 42 when it runs down to the pans 47 and 48.

After a period of use the filtering material becomes inefficient and must either be renewed or revived. With an apparatus such as I have described this may be done without removing the material from the container if desired, or it may be treated with benzol and steam while in the container and removed for drying.

The filter chamber is made tight, the outlet and the inlet of oil cut off, the valves 54, 55, 58 and 59 are opened, and the supply of benzol turned on. The benzol should be clear and clean, free from moisture and the like and should be admitted slowly.

When the benzol passing out the bottom of the chamber is fairly clear, the valves 54 and 55 should be closed and the chamber filled to about a foot above the top of the filtering material and allowed to stand over night. After this the benzol is drained off and the chamber is heated to approximately 300° F. to have the filtering material and everything else contacting with steam at a temperature above that that would tend to condensation. Steam, preferably super-heated, is then admitted and the valves 54 and 55, 58 and 59 opened to permit communication with the steam still 63. Steam should be continued until the odor of benzol is all driven out when the filtering material will be found fully revived to its normal efficiency if not actually increased in efficiency.

By heating the filtering material in the container to approximately the temperature of dry steam and afterwards treating the material with super-heated steam, the fuller's earth or other material is left practically dry at the end of the process.

If super-heated steam is not available, or proper means for heating the chamber are absent, or for any other reason the temperature of the chamber or the steam permits the filtering material to become moist, it can be removed and treated with a suitable dryer.

From the foregoing, it will be clear that I have provided a process by which filtering materials can be thoroughly revived and restored to their normal condition, and also an apparatus by which this can be accomplished with a minimum of handling of the material and a minimum of loss thereof. It is particularly advantageous to pass the cleaning agent through the filtering material in a direction opposite to the movement of the oil that is filtered, for in this way the comparatively narrow portion that is sur-charged with foreign material is much more easily and quickly cleared than when the cleaning agent must pass through in the same direction as the oil.

The benzol can be steam stilled and used repeatedly. Precautions will of course be necessary to keep the benzol clean and clear and free from moisture and to prevent the escape of benzol into the filtering room.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. In the revivifying of earthy filtering materials after they have been used for filtering mineral oil, the steps of flowing therethrough coal gas oil known as benzol until the discharge is substantially colorless, then submerging the filtering material in benzol for several hours depending upon the relative quantities of solvent and filtering material, and then removing the benzol.

2. In the revivifying of earthy materials after they have been used for filtering mineral oil, the steps of flowing therethrough a solvent for the color until the discharge is substantially colorless, then submerging the filtering material in the color solvent for a prolonged period of time, depending upon the relative qualities of solvent and filtering material and then removing the solvent.

LESLIE W. NAYLOR.

CERTIFICATE OF CORRECTION.

Patent No. 1,693,206.   Granted November 27, 1928, to

LESLIE W. NAYLOR.

It is hereby certified that error appears in the printed specification of the above numbered patent requiring correction as follows: Page 1, line 43, for the word "cold" read "coal"; and that the said Letters Patent should be read with this correction therein that the same may conform to the record of the case in the Patent Office.

Signed and sealed this 5th day of February, A. D. 1929.

(Seal)

M. J. Moore,
Acting Commissioner of Patents.

discharge is substantially colorless, then submerging the filtering material in benzol for several hours depending upon the relative quantities of solvent and filtering material, and then removing the benzol.

2. In the revivifying of earthy materials after they have been used for filtering mineral oil, the steps of flowing therethrough a solvent for the color until the discharge is substantially colorless, then submerging the filtering material in the color solvent for a prolonged period of time, depending upon the relative qualities of solvent and filtering material and then removing the solvent.

LESLIE W. NAYLOR.

CERTIFICATE OF CORRECTION.

Patent No. 1,693,206.                 Granted November 27, 1928, to

LESLIE W. NAYLOR.

It is hereby certified that error appears in the printed specification of the above numbered patent requiring correction as follows: Page 1, line 43, for the word "cold" read "coal"; and that the said Letters Patent should be read with this correction therein that the same may conform to the record of the case in the Patent Office.

Signed and sealed this 5th day of February, A. D. 1929.

(Seal)

M. J. Moore,
Acting Commissioner of Patents.